US005740030A

United States Patent [19]

Ottl et al.

[11] Patent Number: 5,740,030

[45] Date of Patent: Apr. 14, 1998

[54] DEVICE FOR CLEANING THE WORKING SURFACES OF A PRINTING PRESS IN PARTICULAR BLANKET WASHING PLANT

[75] Inventors: Josef Ottl, Diedorf; Karl-Heinz Reichel-Langer, Wemding, both of Germany

[73] Assignee: Grafotec GmbH, Diedorf, Germany

[21] Appl. No.: 660,795

[22] Filed: Jun. 6, 1996

[30] Foreign Application Priority Data

Jul. 26, 1995 [DE] Germany ........................ 195 27 249.8

[51] Int. Cl.[6] ........................................ G05B 11/00

[52] U.S. Cl. ........................ 364/138; 101/425; 370/236

[58] Field of Search ........................ 101/425; 364/138; 340/286.01, 286.02; 370/229, 236; 395/200.2, 200.02

[56] References Cited

U.S. PATENT DOCUMENTS

| | | | |
|---|---|---|---|
| 5,103,730 | 4/1992 | Sarda | 101/425 |
| 5,109,770 | 5/1992 | Uribe et al. | 101/425 |
| 5,277,111 | 1/1994 | Uribe et al. | 101/425 |
| 5,323,385 | 6/1994 | Jurewicz et al. | 370/43 |
| 5,444,643 | 8/1995 | Haussler et al. | 364/579 |
| 5,483,230 | 1/1996 | Mueller | 340/825.06 |
| 5,512,890 | 4/1996 | Everson, Jr. et al. | 340/870.13 |
| 5,551,053 | 8/1996 | Nadolski et al. | 395/829 |

*Primary Examiner*—Emanuel T. Voeltz
*Assistant Examiner*—Patrick Assouad
*Attorney, Agent, or Firm*—Harrison & Egbert

[57] ABSTRACT

A device for cleaning the working surfaces of a printing press, in particular a blanket washing plant, with a plurality of washing units, preferably designed as washing bars, controlled by a central processing unit and provided with actuators and sensors is cost-effectively made safer, easier to in stall and to diagnose by a design characterised in that the central processing unit and each subset of washing units comprising at least one washing unit is assigned a communications module located at least near the washing unit, and in that all communications modules are connected to a transmission channel, via which signals can be transmitted and received.

23 Claims, 4 Drawing Sheets

DEVICE FOR CLEANING THE WORKING SURFACES OF A PRINTING PRESS IN PARTICULAR BLANKET WASHING PLANT

FIELD OF THE INVENTION

The invention relates to a device for cleaning the working surfaces of a printing press, in particular a blanket washing plant, with a plurality of washing units, preferably designed as washing bars, connected to a central processing unit and provided with actuators and sensors.

BACKGROUND OF THE INVENTION

In a known blanket washing plant for printing presses, the washing units designed as washing bars, which are associated with the blankets, are equipped with actuators, such as controllable valves for a cleaning fluid to be dispensed, and sensors, the actuators and sensors of each washing unit being connected to a central processing unit for the complete blanket washing plant comprising all washing units and a pumping station associated therewith by means of a, for instance, 25-way connector. For the washing units of each printing unit, the central processing unit has a transfer element which primarily serves as an adapter between the 25-way cables from the washing units and the internal flat conductor cable system of the central processing unit. Each transfer element is connected to a sub-controller designed as a programmable controller for the storage and supply of parameterizable sequences for required operating processes, such as the execution of a washing process, the approach of a washing and drying cloth to a blanket cylinder to be cleaned the opening of valves for the dispensation of a cleaning fluid for dampening the washing and drying cloth, the further transport of the washing and drying cloth and the closing of the valves on completion of the cleaning process. Each sub-controller is connected to the central processing unit of the blanket washing plant by a serial data line. The central processing unit accepts inputs from the operators and overrides the individual sub-controllers.

The individual 25-way-connectors between the washing units and the central processing unit and the arrangement of the cards for the sub-controllers, each having its own power supply unit in a rack, are relatively expensive. A further problem is posed by the fact that the washing units, following the interruption of their connection to the associated transfer elements of the central processing unit, to not go into a safe state, so that, in particular, the valves are not closed and the cleaning cloth is not removed from the cylinder. Maintenance, too, is relatively time consuming, because each individual function has to be tested manually. The retrofitting of further additional printing units and/or washing bars is very expensive as well. Fault finding in case of malfunctions, too, is rather difficult, because it is not clear whether the fault is to be found in a sensor, in the connecting line between the washing bar and the transfer element of the central processing unit, in a plug, in a driver or in the area of a transfer element.

SUMMARY OF THE INVENTION

The problem of the present invention is therefore to create an arrangement which is as simple, as cost-effective, as safe and as easy to maintain as possible. This problem is solved by an arrangement characterised in that the central processing unit and each subset of washing units comprising at least one washing unit is assigned a communications module located at least near the washing unit, and in that all communications modules are connected to a transmission channel, via which signals can be transmitted and received.

The device according to the invention is very cost-effective, because wiring requirements are reduced by providing a common transmission channel for all washing units and assigning communications modules to the central processing unit respectively, all components being moreover very easily installed. Installation requirements, too, are considerably reduced, because there is no need to assign individual sub-controllers for the washing units of each printing unit to the central processing unit. The number of components required is considerably reduced as well.

The device according to the invention further improves the over-all safety of the printing press into which it is installable significantly, since any unexpected behaviour of the washing bars during malfunctions of the communications system can be reliably avoided in the construction according to the invention and the total detergent quantity can easily and accurately be monitored and metered from a central location.

The retrofitting of further additional printing units and/or washing bars does not pose any problems either and can be achieved quickly and at low cost.

Fault finding in case of malfunctions is greatly simplified as well, since the integrated modular overall concept permits the easy detection of the fault location, which makes maintenance significantly simpler and thus less expensive.

Preferred further developments of the invention emerge from the sub-claims.

Each washing unit is preferably assigned a communications module, which, compared to the assignment of a communications module to all washing units of a printing unit, offers the advantage of modular construction and faster fault finding.

A communications module is expediently installed in each washing unit, so that the washing unit only has to be connected to the transmission channel when installing the system on site.

In one development of the invention, the communications modules are designed as field bus nodes, while the transmission channel forms the field bus of a field bus system, since this arrangement results in a cost-effective, easily maintained system, which is reliable in the operating condition; of a printing press.

The transmission channel is preferably used for the transmission of macros, which, in comparison with the transmission of individual signals for driving actuators or selecting sensors, offers the advantage of a lower bus load and thus higher reliability and lower fault liability. A macro comprises at least a header with an identification character associated with a specific communications module of a washing unit, which is to be addressed, or of the central processing unit, and a data sequence to be interpreted by said communications module as an enquiry, command or response; this arrangement enables reliable and compressed transmission.

All users connected to the transmission channel are expediently detectable by a detection subroutine via the communications module associated with the central processing unit, which thus knows the configuration of the system.

The bus system comprising the communications modules and the transmission channel can, at least during runup, expediently be subjected to an automatic self-checking process governed by a self-checking programme in the central processing unit, which would reliably detect any communication malfunctions.

A can field bus protocol can be implemented in the communications modules, since this has already proved reliable in other applications.

The access of the communications modules to the transmission channel is preferably controlled by priorities which can be determined for each communications module and stored in the memory; this ensures fast arbitration. The transmission access of a communications module to the transmission channel would expediently incorporate a priority sequence as start sequence, which would predominate over other communications modules of lower priority on the transmission channel if these simultaneously transmit their own priority sequences. The solution may, for instance be an open-collector system.

A danger signal to be transmitted would expediently have priority over all other priorities, enabling any arising danger to be transmitted fast and reliably via the transmission channel. A specific hazard situation may either have the same priority in all communications modules or a different high-order priority in each individual communications module.

A further development of the invention provides for a central processing unit for blanket washing plants, which can be connected to a control station etc. without further adaptation. Another development of the invention has a control station computer for printing presses as central processing unit, permitting a very advantageous design of the device, in particular the blanket washing plant controller.

Each washing bar communications module is expediently connected to a local control module via signal lines for the activation of actuators, the selection of sensors and the storage and execution of operational sequences, which ensures a high degree of independence for each washing bar. By means of the control module, local self-checks can preferably be performed for the indication of faults in actuators, sensors or the wiring in the washing bar.

It is expedient to have a washing bar brought into a safe state by a termination subroutine in the control or communications module, when a local fault is detected during a local self-check.

The control module of a washing bar is preferably programmable from the central processing unit by transmitting programme data via the transmission channel to the control module of the washing bar, this allowing the fast and reliable adaptation of the system to different print orders from the central processing unit, in particular from the control station. The local action programme for driving actuators, selecting sensors and execution programme steps in a control module can expediently be modified from the control station by a subroutine for the transmission of changes.

The possibility of modifying the local communications programme in the communications module of a washing bar from the central processing unit can also offer advantages, enabling the communications parameters to be reconfigured from the central processing unit.

The control module of a washing bar would preferably incorporate a local adjustment subroutine for local adjustment in dependence on data measured by sensors; this would ensure the consistently reliable function of the system without undue loading of the transmission channel or the central processing unit. In this way, contamination, e.g. in the valves, and deviations from manufacturing tolerances, e.g. in the nozzle diameter or the pressurization of the nozzles, can be compensated for.

The theoretical detergent quantity to be dispensed to a washing bar is expediently determined by a detergent quantity control subroutine in the central processing unit, while the actual detergent quantity in a washing bar as measured by a sensor is scanned by a detergent quantity detection subroutine in the central processing unit, permitting the central presetting of theoretical cleaning agent quantities and the central detection of actually dispensed quantities. The total cleaning agent quantity is expediently calculated from the quantities dispensed to individual washing units by an addition subroutine in the central processing unit.

A fault monitoring subroutine in the central processing unit for the detection of faults in the actuators and/or sensors of a washing bar, permitting the central detection of the overall functional state of the washing plant also offers advantages.

The communications modules in the washing units are preferably fully enclosed to avoid the negative effects of local humidity and of the cleaning agent.

Further features and advantages emerge from the additional sub-claims and the description of an embodiment with reference to the drawing, of which:

DESCRIPTION OF THE PREFERRED EMBODIMENT

Figure 1:
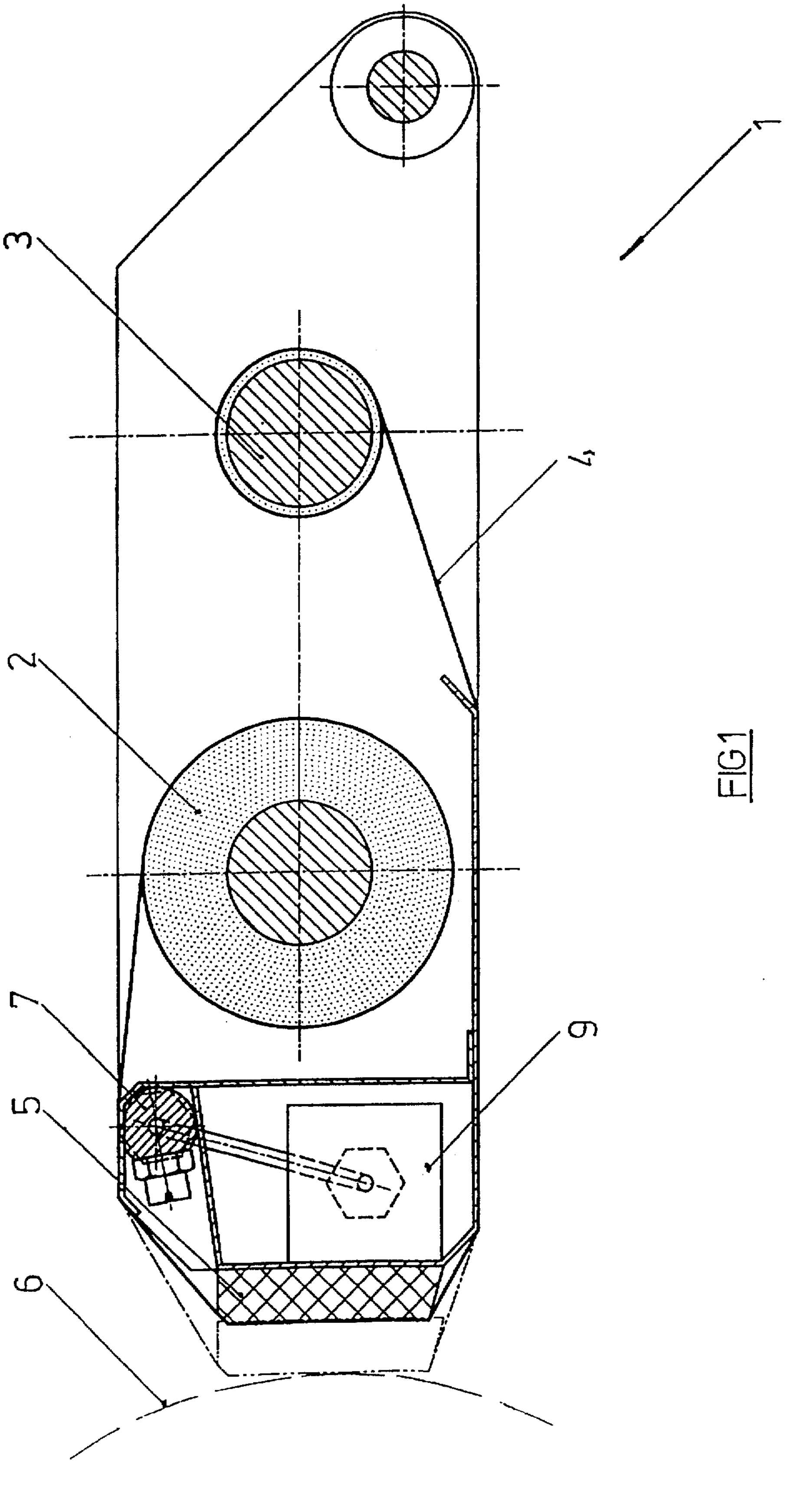
FIG. 1 is a section through a washing bar of a blanket washing device associated with a blanket cylinder.
Figure 2:
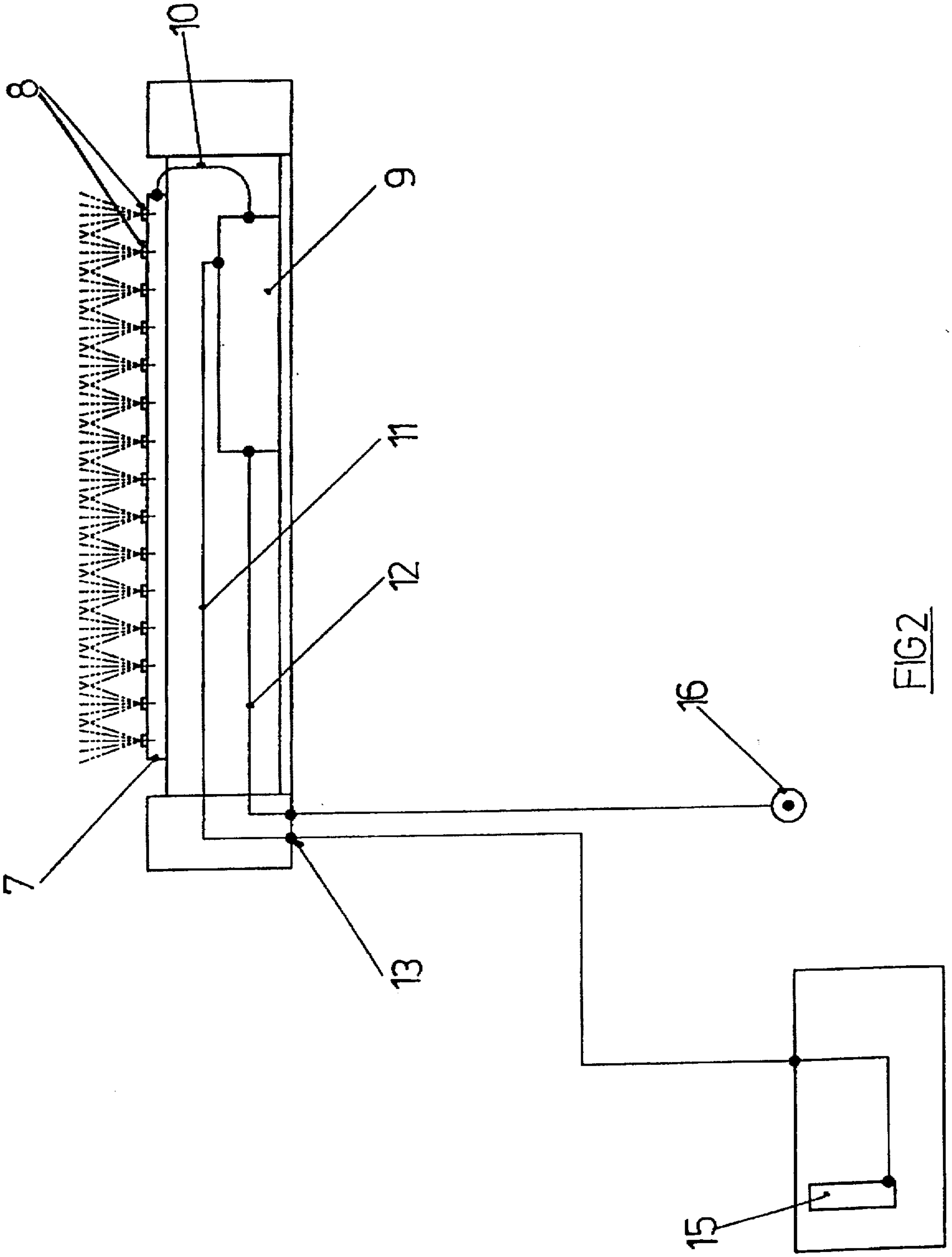
FIG. 2 is a diagrammatic representation of the washing bar illustrated in FIG. 1 and the associated fluid pump and pressure pulse generator.

FIG. 1 illustrates the known construction of the mechanical parts of a washing bar 1 with a, for instance, non-woven washing and drying cloth 4 fed from a supply roller 2 to be taken up by a take-up roller 3 after use, the cloth being guided on the blanket cylinder side of the washing bar 1 by a flexible clamping bar 5. As indicated by the broken lines in FIG. 1, the clamping bar 5 can be brought into contact with and lifted off a blanket cylinder 6 for washing. For cleaning the blanket cylinder 6, the washing and drying cloth 4 can be charged with a cleaning fluid via nozzles 8 arranged on a nozzle bar 7, a pressure booster assembly 9 integrated with the washing bar 1 being provided to provide a high pressure at the nozzles 8. As FIG. 2 shows, this is connected to the nozzle bar 7 via a short high-pressure line 10. The pressure booster assembly 9 can be supplied with cleaning fluid via a fluid line 11 and with compressed air for operation via a compressed air line 12, the compressed air line 12 being connected to a pressure pulse generator 16 and the fluid line 11 being connected to a fluid pump 15 via a coupling device 13. The high-pressure line 10, the fluid line 11, the compressed air line 12 and other lines such as the supply line of the fluid pump or the pressure pulse generator can be closed by electronically controlled valves not shown in the illustration.

Figure 3:
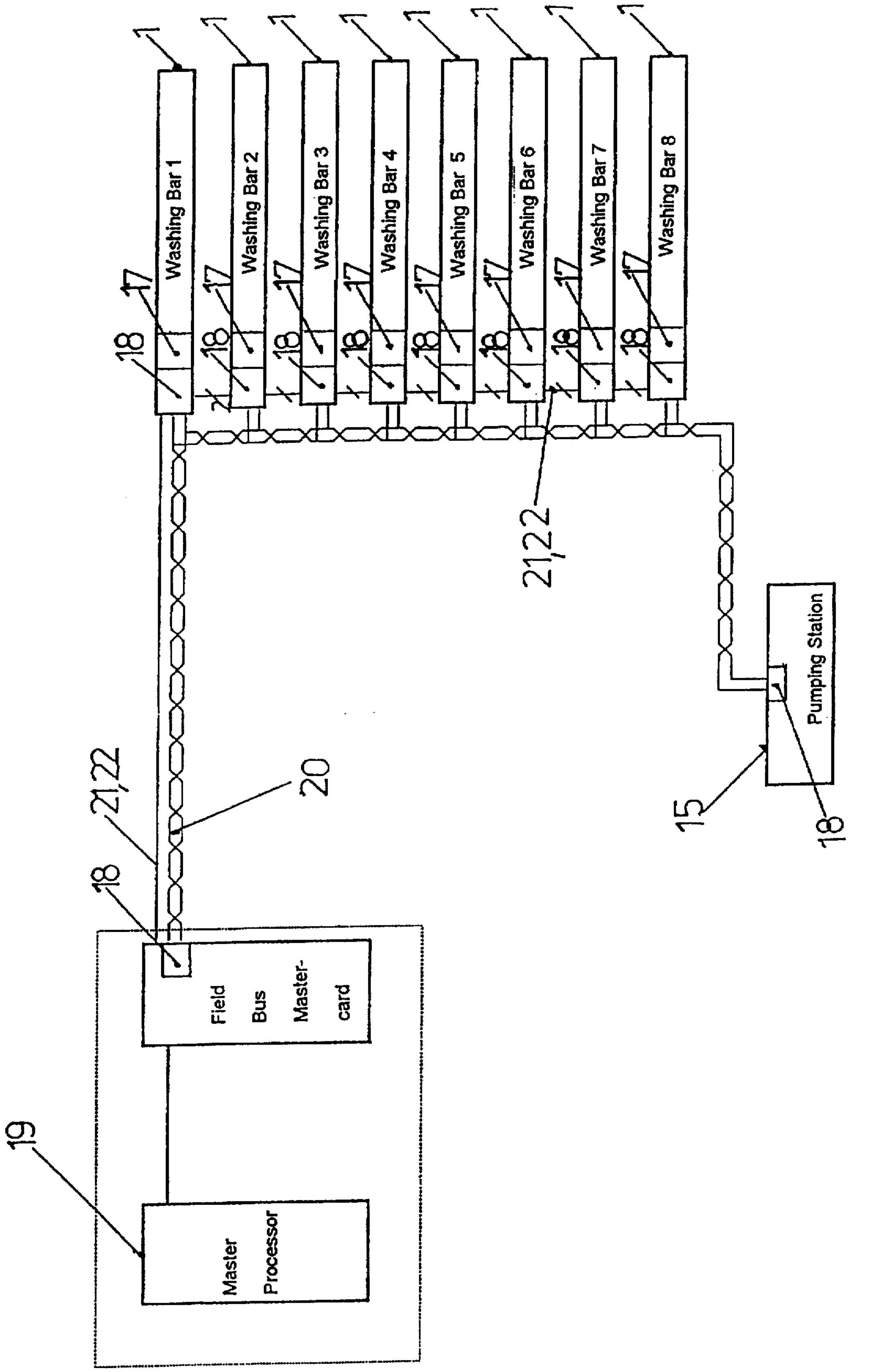
FIG. 3 is a block diagram of a blanket washing plant according to the invention with a washing bar communicating with a central processing unit via a common transmission channel.

FIG. 3 illustrates the components communicating with each other by means of a block diagram. Each washing device 1 here designed as a washing bar incorporates a control module 17 provided in particular for selecting actuators 24 and sensors 23 and for the storage of sequences, and a communications module 18. The pumping station 15 and the central processing unit 19, too, are provided with communications modules 18. All communications modules 18 are connected to a common transmission channel 20, the transmission channel 20 being designed as a field bus, the communications modules as field bus nodes or field bus mastercards of a field bus system. The field bus mastercard is located in the central processing unit 19, which is designed as a central processing unit for blanket washing plants; in an integrated design, the blanket control station computer can also be used as a central processing unit 19. In the present case, CAN field bus protocol is implemented in the communications modules 18.

In the communications system illustrated, each communications module 18 can both transmit and receive signals. In this way, data can be transmitted to any washing bar from the central processing unit 19 via its communications module 18, the transmission channel 20 and the communications module 18 of the washing bar in question, while information such as sensor data, danger and fault messages can be transmitted from any washing bar 1 via its communications module 18 and the transmission channel 20 to the communications module 18 of the central processing unit 19.

Essential for the function of the field bus system are here, in particular, the access control for individual communications modul priority control, a priority control, the addressing of the communications modules and the format of the data to be transmitted.

The access of the communications modules 18 to the transmission channel 20 is, in the present example, controlled by priorities associated with each communications module and stored in a memory, whereby the relationship between the priorities of the communications modules 18 of the washing bars 1 and the priority of the communications module 18 of the pumping station 15 can be selected as required, while the communications module 18 of the central processing unit 19, i.e. the field bus mastercard, has a higher priority than those of the washing bars 1 and the fluid pump 15. The highest priority is allocated to danger messages, and this highest priority can be used by each user, in particular by the washing bars 1, irrespective of its individual priority. In this way, hazardous states, for instance malfunctions in the feed of cleaning fluid, in pressure pulses or in valve control, can be relayed without delay, enabling the necessary measures to be taken.

If a communications module 18 attempts to transmit data via the transmission channel 20, it first reserves the channel with its priority flag, simultaneous logon of several communications modules 18 leading to the assertion of the highest priority sequence on the transmission channel 20; this is recognised by all communications modules 18, so that only the communications module 18 which has asserted its highest priority will then transmit on the transmission channel 20. The priority sequence of a communications module 18 can, for instance, contain logic "0" and "1" signals, a collision of a "1" signal with a "0" signal of another communications module 18 of lower priority resulting in a "1" signal on the transmission channel 20, which is here designed as a field bus. This may, for instance, be implemented in the form of an open-collector solution.

If a communications module 18 is permitted to transmit because of its priority, it initiates the transmission of data. These may be macros, each macro comprising at least a header with an identification character associated with a specific communications module of a washing unit or of the central processing unit 19, which is to be addressed, and a data sequence to be interpreted by said communications module 18 as an enquiry, command or response. A macro of the central processing unit 19 can, for instance, be transmitted to a washing bar 1, causing its control module 17 to execute a preset programme stored in the memory, by, for instance, moving a washing bar 1 into contact with the associated blanket cylinder 6, opening the appropriate valves and charging the washing and drying cloth 4 with a cleaning fluid, deactivating the appropriate valves, the pump or the pressure pulse generator and lifting the clamping bar 5 of the washing bar off the blanket cylinder 6. The central processing unit further may transmit, for instance, a common macro to all washing bars in the form of an enquiry regarding the cleaning fluid used to date, the washing bars responding to the central processing unit 19, in a sequence determined by their respective priorities, with a record indicating the cleaning fluid quantity used so far. This enables the central processing unit to calculate the total cleaning fluid quantity used from the cleaning fluid quantities signalled by the individual washing units 1 by means of an addition subroutine and to determine whether this quantity has exceeded a hazardous value with regard to the fire hazard in the drier of the printing press.

The modular concept of the device according to the invention enables function checks on various levels to be performed during runup, i.e. the activation of the system, and during operation.

In accordance with a standard protocol, the central processing unit 19 may, for instance, by means of its own communications module 18, ascertain all users active on the field bus, i.e. all washing bars 1 connected via their communications modules 18, detect missing users or additional users and inform the control station accordingly. In the same way, the operation of the system can be periodically monitored to indicate whether all users can still operate without malfunction; for this purpose, the central processing unit 19 can transmit an enquiry requiring a response to all users. In addition to this, there is the possibility of the routine local diagnosis of the communications modules 18 of each washing bar 1, permitting an alarm signal to be given when quality is reduced. In cases of communications failure via the transmission channel 20, a communications module 18 can cause the associated control module 17 to switch the washing bar into a stable state, in which, for instance, all valves enabling the cleaning fluid to be dispensed are closed. Another possibility is the running self-check of actuators 24 and sensors 23 or the plausibility check of sensor messages by a control module 17 of a washing bar 1, enabling a danger message, if necessary of high priority, or a fault message to be transmitted via the transmission channel 20, if a fault occurs.

From the central processing unit 19, the washing programme in the washing bars 1 can be re-configured at any time via the transmission channel 20, permitting the perfectly simple adaptation of the programme to the production requirements of the printing press from the central processing unit, in particular with regard to washing intervals, the detergent quantify required for the paper to be used etc.

The modular construction with independent local systems in the washing bars 1 also greatly simplifies fault finding and maintenance, because faults can be located significantly faster.

Figure 4:
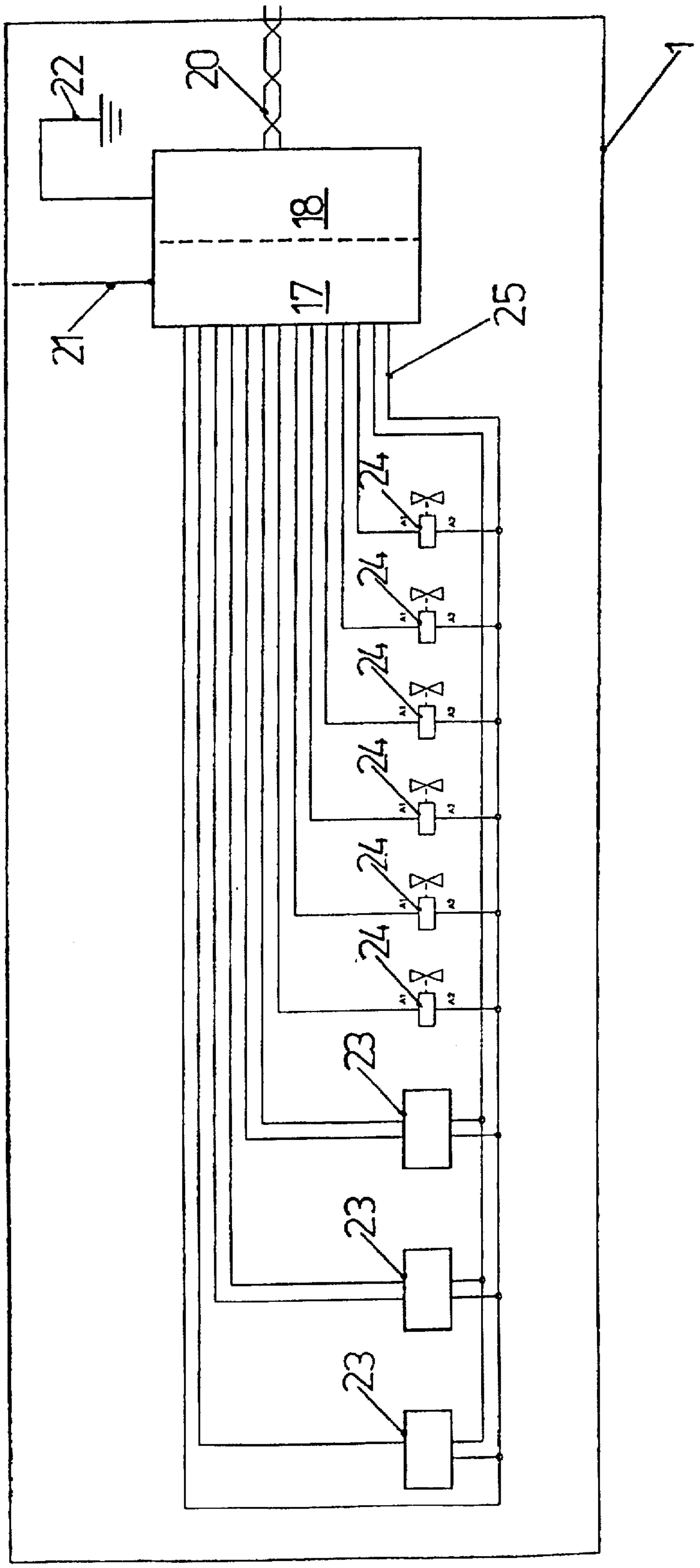
FIG. 4 is a block diagram of the electronic components of a washing bar.

FIG. 4 illustrates the construction of the electronic components of a washing bar 1. Communication is based on a communications module 18 connected to the transmission channel 20 and linked to a control module 17 by means of lines, in particular data lines, not shown in the drawing. Though separate modules 17, 18 are provided in the present embodiment, the communications module 18 can be combined with the control module 17 on a motherboard. Here, the two modules 17, 18 are connected to a common voltage supply with a supply connector 21 and a ground connector 22. The voltage supply is indicated in FIG. 3 as well, the actual system not necessarily requiring the illustrated connection between pairs of washing bars; all washing bars can alternatively be supplied centrally or connected to bus bars etc. FIG. 4 also shows several sensors 23, which may, for instance, be flow meters to measure the cleaning fluid quantity dispensed or the like, and several actuators 24, which may, as in the illustrated case, be designed as controllable valves regulating the cleaning fluid supply or the pressure pulses. The sensors 23 and actuators 24 are here wired to a common ground lead 25. The actuators 24 are activated by the control module 17 in accordance with a stored sequence to be executed, for instance, in response to an activation command issued by the central processing unit 19, or after a preset time delay controlled by a timer in the control module 17.

The invention is not restricted to the embodiment described and illustrated here. Provided it is suitably adapted, it can, in particular, be used with washing bars of a different mechanical construction or with different transmission channels, such as coaxial or optical fibre networks.

We claim:

1. A device for cleaning working surfaces of a printing press, the printing press having a plurality of washing units divided into subsets with each subset having at least one washing unit, a central processing unit connected to the plurality of washing units, and actuators and sensors, the device comprising:

- a plurality of communication modules, each module being located near a respective washing unit and assigned to the respective washing unit and to the central processing unit;
- a transmission channel; and
- means connecting all of said plurality of communications modules to said transmission channel whereby signals can be transmitted and received via said transmission channel, the module of each washing unit being connected to a local control means by a signal line for activation of the actuators and for selection of the sensors and for execution of operational sequences.

2. Device according to claim 1, wherein each washing unit is associated with a separate communications module.

3. Device according to claim 2, wherein a said separate communications module is installed in each washing unit.

4. Device according to claim 1, wherein said transmission channel is in the form of a form bus; and said communications modules are in the field of field bus nodes of a field bus system.

5. Device according to claim 1, wherein said transmission channel is such as to enable macros to be transmitted via said channel.

6. Device according to claim 5, wherein each of said macros comprises at least a header with an identification character associated with a specific said communications module of a washing unit to be addressed, of the central processing unit or of another unit, and a data sequence to be interpreted by said communications module as an enquiry, command or response.

7. Device according to claim 5, wherein a detection subroutine is provided, located in the central processing unit, which subroutine detects all users connected to said transmission channel at least via the separate said communications module associated with the central processing unit.

8. Device according to claim 4, wherein means are provided including a self-checking program in the central processing unit, such that said bus system comprising said communications modules and said transmission channel can, at least during runup, be subjected to an automatic self-checking process governed by said self-checking program.

9. Device according to claim 2, wherein means are provided to implement a CAN field bus protocol in each said communications module.

10. Device according to claim 1, further comprising:

- a memory associated with each of said communications modules in which priorities can be determined for each of said plurality of communications modules and stored, which said priorities control in the access of said plurality of communications modules to said transmission channel.

11. Device according to claim 10, wherein said plurality of communications modules comprise a transmission access to said transmission channel, and said access incorporates a priority sequence as a start sequence, which predominates over other communications modules of lower priority on said transmission channel in cases of collision with their priority sequences.

12. Device according to claim 11, wherein said plurality of communications modules have a priority sequence, which sequence contains logic "0" and "1" signals, a collision of a "1" signal with a "0" signal of another of said communications modules of lower priority results in a "1" signal on said transmission channel.

13. Device according to claim 10, wherein a danger signal to be transmitted has priority over all other said priorities.

14. Device according to claim 1, wherein the central processing unit is a central processing unit for blanket washing plants.

15. Device according to claim 1, wherein the central processing unit is a control station computer for printing presses.

16. Device according to claim 1, wherein the control module of a washing unit can perform local self checks.

17. Device according to claim 1, wherein a washing unit can be brought into a safe state by a termination subroutine in the control module or the communications module of a washing unit, when a local fault is detected during a local self-check.

18. Device according to claim 1, wherein said control module of a washing unit is programmable from the central processing unit by transmitting program data via said transmission channel to said control module of the washing unit.

19. Device according to claim 1, wherein a local action program means is provided for driving actuators, and for selecting sensors and executing program steps in said control means and which can be modified from a control station by a subroutine for the transmission of changes in the control means.

20. Device according to claim 1, wherein a local communications program is provided in said plurality of communications modules of the washing units and said programs can be modified from the central processing unit.

21. Device according to claim 1, wherein a local adjustment subroutine is provided in said control means of the washing units, for local adjustment in dependence on data measured by sensors.

22. A device for cleaning working surfaces of a printing press, the printing press having a plurality of washing units divided into subsets with each subset having at least one washing unit, a central processing unit connected to the plurality of washing units, and actuators and sensors, the device comprising:

a plurality of communication modules, each module being located near a respective washing unit and assigned to the respective washing unit and to the central processing unit;

a transmission channel; and means connecting all of said plurality of communications modules to said transmission channel whereby signals can be transmitted and received via said transmission channel;

a detergent quality control subroutine means provided in the central processing unit for determining a theoretical detergent quantity to be dispensed to a washing unit, for scanning an actual detergent quantity in a washing unit as measured by a sensor, and for calculating the total cleaning agent quantity from a quantities output from the individual washing units; and a fault monitoring subroutine means provided in the central processing unit for detecting faults in the actuators and sensors of a washing unit.

23. Device according to claim 1, wherein enclosure means are provided for said plurality of communications modules in the washing units such that said modules are fully enclosed.

* * * * *